(12) United States Patent
Peressini et al.

(10) Patent No.: US 6,264,325 B1
(45) Date of Patent: Jul. 24, 2001

(54) ROTATABLE LENS EYEGLASSES

(76) Inventors: Leonie S. Peressini; Lisa Peressini, both of 714 4001 Bayview Ave., North York, Ontario (CA), M2M 3Z7

( * ) Notice: Subject to any disclaimer, the term of this patent is extended or adjusted under 35 U.S.C. 154(b) by 0 days.

(21) Appl. No.: 09/586,031

(22) Filed: Jun. 2, 2000

(51) Int. Cl.[7] ............................................. G02B 9/02
(52) U.S. Cl. ................................. 351/59; 351/41
(58) Field of Search ......................... 351/59, 57, 58, 351/41

(56) References Cited

U.S. PATENT DOCUMENTS

| D. 153,955 | 5/1949 | Lauber . |
|---|---|---|
| 2,628,352 | * 2/1953 | Astruck ................................. 351/59 |
| 2,752,819 | 7/1956 | Krukowski . |
| 3,434,780 | 3/1969 | Bolden . |
| 3,840,294 | 10/1974 | Kneier . |
| 4,405,213 | 9/1983 | Kolkmann . |
| 4,880,302 | 11/1989 | Meillet . |

* cited by examiner

*Primary Examiner*—Hung Xuan Dang

(57) ABSTRACT

A rotatable lens eyeglasses for allowing access to the eye of the user without having to remove the eyeglasses. The rotatable lens eyeglasses includes a frame having a front and a pair of arms. The front comprises a pair of vision frames. Each vision frame is defined by only an upper part that is curved such that each vision frame is entirely laterally outside and above the visual range of an associated eye of a user. A bridge connects the pair of vision frames. Each of a pair of lenses is hingedly coupled to one of the opposite ends of the vision frames with respect to the bridge.

9 Claims, 2 Drawing Sheets

ROTATABLE LENS EYEGLASSES

BACKGROUND OF THE INVENTION

1. Field of the Invention

The present invention relates to eyeglasses and more particularly pertains to new rotatable lens eyeglasses for allowing access to the eye of the user without having to remove the eyeglasses.

2. Description of the Prior Art

The use of eyeglasses is known in the prior art. More specifically, eyeglasses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,880,302; U.S. Pat. No. 4,405,213; U.S. Pat. No. 3,840,294; U.S. Pat. No. 2,751,819; U.S. Pat. No. 3,434,780; and Des. U.S. Pat. No. 153,955.

While these devices fulfill their respective, particular objectives and requirements, the aforementioned patents do not disclose new rotatable lens eyeglasses. The inventive device includes a frame having a front and a pair of arms. The front comprises a pair of vision frames. Each vision frame is defined by only an upper part that is curved such that each vision frame is entirely laterally outside and above the visual range of an associated eye of a user. A bridge connects the pair of vision frames. Each of a pair of lenses is hingedly coupled to one of the opposite ends of the vision frames with respect to the bridge.

In these respects, the rotatable lens eyeglasses according to the present invention substantially departs from the conventional concepts and designs of the prior art, and in so doing provides an apparatus primarily developed for the purpose of allowing access to the eye of the user without having to remove the eyeglasses.

SUMMARY OF THE INVENTION

In view of the foregoing disadvantages inherent in the known types of eyeglasses now present in the prior art, the present invention provides new rotatable lens eyeglasses construction wherein the same can be utilized for allowing access to the eye of the user without having to remove the eyeglasses.

The general purpose of the present invention, which will be described subsequently in greater detail, is to provide new rotatable lens eyeglasses apparatus and method which has many of the advantages of the eyeglasses mentioned heretofore and many novel features that result in new rotatable lens eyeglasses which is not anticipated, rendered obvious, suggested, or even implied by any of the prior art eyeglasses, either alone or in any combination thereof.

To attain this, the present invention generally comprises a frame having a front and a pair of arms. The front comprises a pair of vision frames. Each vision frame is defined by only an upper part that is curved such that each vision frame is entirely laterally outside and above the visual range of an associated eye of a user. A bridge connects the pair of vision frames. Each of a pair of lenses is hingedly coupled to one of the opposite ends of the vision frames with respect to the bridge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new rotatable lens eyeglasses apparatus and method which has many of the advantages of the eyeglasses mentioned heretofore and many novel features that result in new rotatable lens eyeglasses which is not anticipated, rendered obvious, suggested, or even implied by any of the prior art eyeglasses, either alone or in any combination thereof.

It is another object of the present invention to provide new rotatable lens eyeglasses which may be easily and efficiently manufactured and marketed.

It is a further object of the present invention to provide new rotatable lens eyeglasses which is of a durable and reliable construction.

An even further object of the present invention is to provide new rotatable lens eyeglasses which is susceptible of a low cost of manufacture with regard to both materials and labor, and which accordingly is then susceptible of low prices of sale to the consuming public, thereby making such rotatable lens eyeglasses economically available to the buying public.

Still yet another object of the present invention is to provide new rotatable lens eyeglasses which provides in the apparatuses and methods of the prior art some of the advantages thereof, while simultaneously overcoming some of the disadvantages normally associated therewith.

Still another object of the present invention is to provide new rotatable lens eyeglasses for allowing access to the eye of the user without having to remove the eyeglasses.

Yet another object of the present invention is to provide new rotatable lens eyeglasses which includes a frame having a front and a pair of arms. The front comprises a pair of vision frames. Each vision frame is defined by only an upper part that is curved such that each vision frame is entirely laterally outside and above the visual range of an associated eye of a user. A bridge connects the pair of vision frames. Each of a pair of lenses is hingedly coupled to one of the opposite ends of the vision frames with respect to the bridge.

Still yet another object of the present invention is to provide new rotatable lens eyeglasses that have a magnets on the lenses and metallic lugs on the bridge for holding the lenses against the frame of the eyeglasses.

Even still another object of the present invention is to provide new rotatable lens eyeglasses that allows access to the eye for make-up and contacts These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
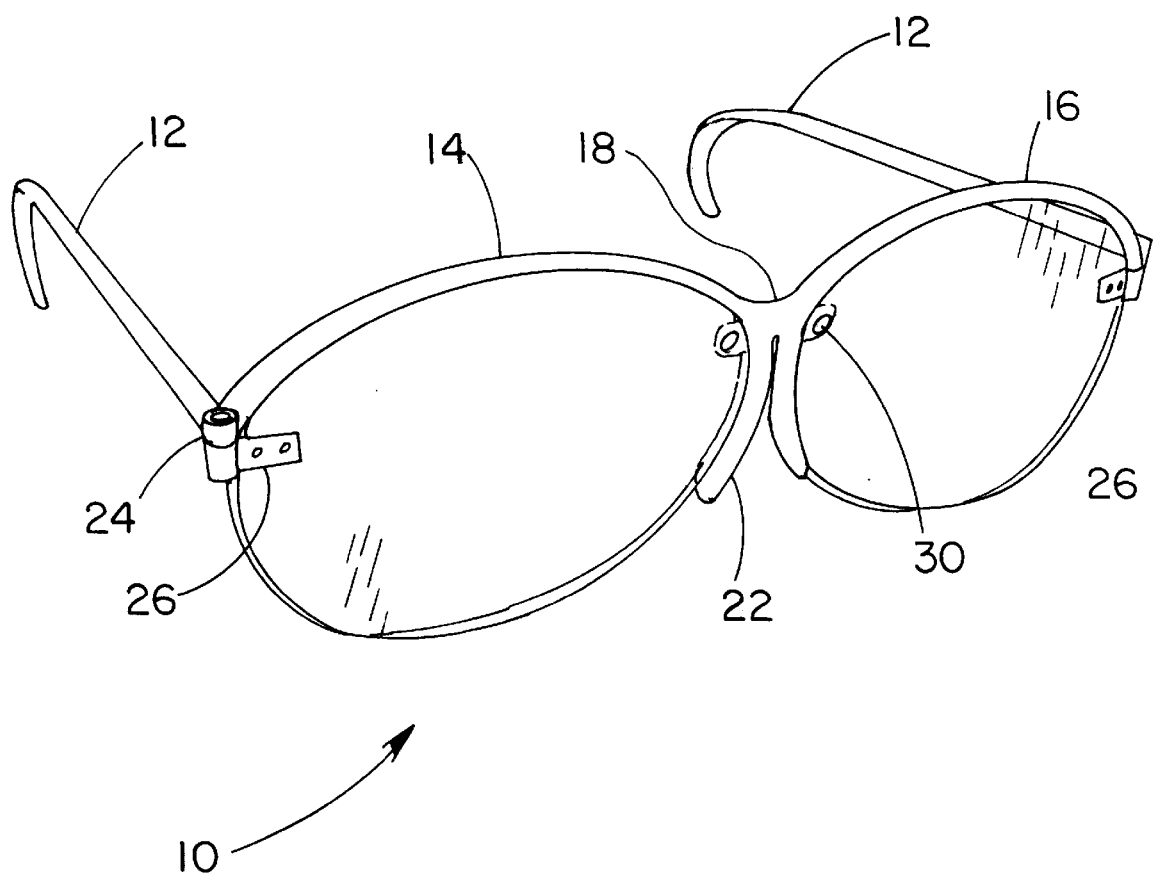
FIG. 1 is a schematic perspective view of new rotatable lens eyeglasses according to the present invention.
Figure 2:
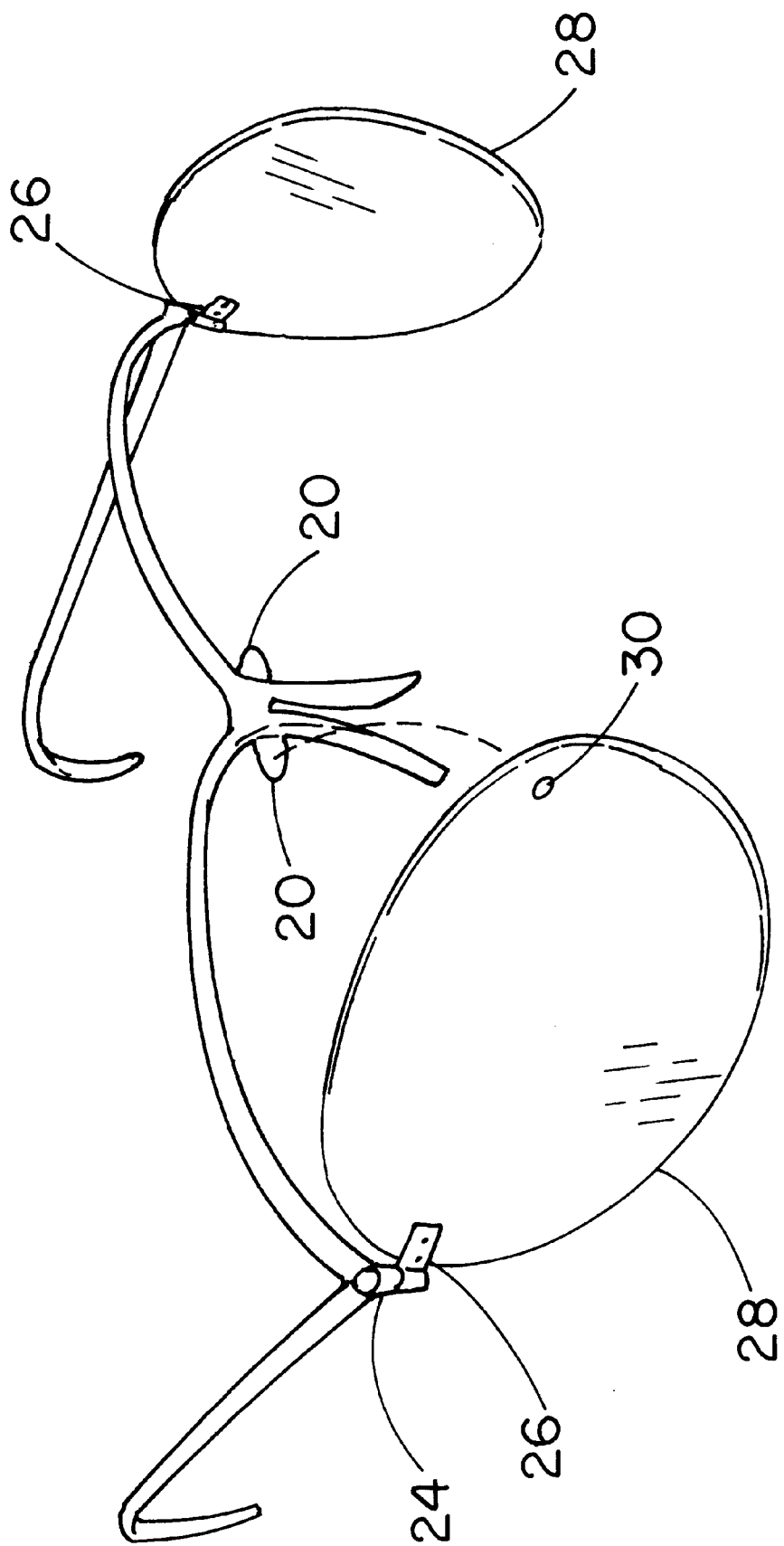
FIG. 2 is a schematic perspective view of the present invention.

With reference now to the drawings, and in particular to FIGS. 1 and 2 thereof, new rotatable lens eyeglasses embodying the principles and concepts of the present invention and generally designated by the reference numeral 10 will be described.

As best illustrated in FIGS. 1 and 2, the rotatable lens eyeglasses 10 generally comprises a frame having a front and a pair of arms 12. Each of the arms 12 is hingedly coupled to the front. The front comprises a pair of vision frames 14, 16. Each vision frame 14, 16 is defined by only an upper part that is curved such that each vision frame is entirely laterally outside and above the visual range of an associated eye of a user. Each of the arms 12 is hingedly coupled to one of the outside portions of the vision frames 14, 16.

A bridge 18 connects the pair of vision frames 14, 16. A saddle 22 for being disposed on the nose of a user is integrally coupled to and extends downwardly away from the bridge 18.

Each of a pair of lugs 20 is integrally coupled to the bridge 18 and extends in opposite directions from each other such that each extends toward one of the junctures of the arms 12 and the vision frames 14, 16. Each of the lugs 20 comprises a metal.

Each of a pair hinge members has a fixed portion 24 coupled to one of the vision frames 14, 16 at a juncture of the arms 12 and the vision frames 14, 16. Each of the hinge members has a plate portion 26 adapted to rotate with respect to the fixed portion 24. The plate portions 26 are horizontally rotatable about vertical axes of the fixed portions 24.

Each of a pair of lenses 28 is fixedly coupled to one of the plates 26 such that each of the lenses 28 may be disposed within one of the vision frames 14, 16. The lens 28 may rotate with respect to the vision frames 14, 16. The lenses 28 each define a conventional eyepiece and may also comprise tinted glasses such as are used in sunglasses.

Each of a pair of magnets 30 is fixedly coupled to one of the lenses 28. The magnets 30 are positioned such that each of the magnets 30 is abuttable against one of the lugs 20 when a respective lens is positioned adjacent to the bridge 18.

In use, the user wears the glasses 10 like conventional glasses. When the user needs to have access to their eyes for make-up, contacts, or other reason, the user rotates the lens 28 away from the vision frame 14. The magnet 30 and lug 20 holds the lens 28 adjacent to the vision frame 14 and the lug 20 prevents the lens 28 from over-rotating towards the eye of the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pair of make-up eyeglasses, said eyeglasses comprising:

a frame having a front and a pair of arms, said front comprising:

a pair of vision frames, each vision frame being defined by only an upper part being curved such that each vision frame is entirely laterally outside and above the visual range of an associated eye of a user;

a bridge, said bridge connecting the pair of vision frames; and a pair of lenses, each of said lenses being hingedly coupled to one of the opposite ends of said vision frames with respect to said bridge;

a pair of lugs, each of said lugs being integrally coupled to said bridge and extending in opposite directions toward a junction of said arms and said vision frames, each of said lugs comprising a magnetically receptive material; and a pair of magnets, each of said magnets being fixedly coupled to one of said lenses, said magnets being positioned such that each of said magnets are abuttable against one of said lugs when a respective lens is positioned adjacent to said bridge.

2. The pair of make-up eyeglasses as in claim 1, further comprising:

a saddle for being disposed on the nose of a user, said saddle being integrally coupled to and extending downwardly away from said bridge.

3. The pair of make-up eyeglasses as in claim 1, further comprising:
a pair of hinge members for hingedly coupling one of said lenses to said vision frames, each of said hinge members having a fixed portion coupled to one of said vision frames at a juncture of said arms and said vision frames, each of said hinge members having a plate portion adapted to rotate with respect to said fixed portion, wherein said plate portions are generally horizontally rotatable about vertical axes of said fixed portions.

4. A pair of make-up eyeglasses, said eyeglasses comprising:
a frame having a front and a pair of arms, each of said arms being hingedly coupled to said front, said front comprising:
a pair of vision frames, each vision frame being defined by only an upper part being curved such that each vision frame is entirely laterally outside and above the visual range of an associated eye of a user, wherein each of said arms is hingedly coupled to one of an outside portions of said vision frames;
a bridge, said bridge connecting the pair of vision frames;
a saddle for being disposed on the nose of a user, said saddle being integrally coupled to and extending downwardly away from said bridge;
a pair of lugs, each of said lugs being integrally coupled to said bridge and extending in opposite directions from each other such that each extends toward one of the junctures of said arms and said vision frames, each of said lugs comprising a metal;
a pair of hinge members, each of said hinge members having a fixed portion coupled to one of said vision frames at a juncture of said arms and said vision frames, each of said hinge members having a plate portion adapted to rotate with respect to said fixed portion, wherein said plate portions are horizontally rotatable about vertical axes of said fixed portions;
a pair of lenses, each of said lenses being fixedly coupled to one of said plates such that each of said lenses may be disposed within one of said vision frames, wherein said lens may rotate with respect to said vision frames, said lenses each defining an eyepiece; and
a pair of magnets, each of said magnets being fixedly coupled to one of said lenses, said magnets being positioned such that each of said magnets are abuttable against one of said lugs when a respective lens is positioned adjacent to said bridge.

5. An eyeglass system comprising:
a frame having a front and a pair of arms extending from said front, said front comprising:
a pair of vision frames, each vision frame being defined by an upper part positionable outside and above the visual range of an associated eye of a user when said frame is worn by a user;
a bridge connecting said pair of vision frames such that each of the vision frames has an end positioned opposite the bridge; and
a pair of lenses, each of said lenses being pivotally coupled to one of the ends of said vision frames, each of the lenses being pivotable about an axis oriented substantially perpendicularly to the upper part of the vision frame such that the lens is pivotable about a substantially vertical axis when said frame is worn by a user.

6. The eyeglass system of claim 5 additionally comprising:
a pair of lugs, each of said lugs being integrally coupled to said bridge and extending in opposite directions toward a junction of said arms and said vision frames, each of said lugs comprising a magnetically receptive material.

7. The eyeglass system of claim 6 wherein a pair of magnets, each of said magnets being fixedly coupled to one of said lenses, each of said magnets being positioned such that said magnet is abuttable against one of said lugs when a respective lens is positioned adjacent to said bridge.

8. The pair of make-up eyeglasses as in claim 5, further comprising:
a saddle for being disposed on the nose of a user, said saddle being integrally coupled to and extending downwardly away from said bridge.

9. The pair of make-up eyeglasses as in claim 5, further comprising:
a pair of hinge members, each of said hinge members pivotally coupling one of said lenses to said vision frames, each of said hinge members having a fixed portion coupled to one of said vision frames at a juncture of said arms and said vision frames, each of said hinge members having a plate portion adapted to rotate with respect to said fixed portion, wherein said plate portions are generally horizontally rotatable about vertical axes of said fixed portions.

* * * * *